United States Patent
Dudar et al.

(10) Patent No.: US 11,699,345 B2
(45) Date of Patent: Jul. 11, 2023

(54) SYSTEMS AND METHODS FOR DETERMINING AND IMPROVING A PARKING POSITION

(71) Applicant: Ford Global Technologies, LLC, Dearborn, MI (US)

(72) Inventors: Aed M. Dudar, Canton, MI (US); Finn Finn Tseng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 95 days.

(21) Appl. No.: 17/201,406

(22) Filed: Mar. 15, 2021

(65) Prior Publication Data
US 2022/0292970 A1 Sep. 15, 2022

(51) Int. Cl.
*G08G 1/14* (2006.01)
*B60W 60/00* (2020.01)
*B60W 30/06* (2006.01)

(52) U.S. Cl.
CPC ............. *G08G 1/143* (2013.01); *B60W 30/06* (2013.01); *B60W 60/001* (2020.02); *G08G 1/148* (2013.01)

(58) Field of Classification Search
CPC ....... G08G 1/143; G08G 1/148; B60W 30/06; B60W 60/001
See application file for complete search history.

(56) References Cited

U.S. PATENT DOCUMENTS

| | | | |
|---|---|---|---|
| 6,646,568 B2 | 11/2003 | MacPhail et al. | |
| 10,832,574 B1* | 11/2020 | Agarwal | G08G 1/141 |
| 2017/0267233 A1 | 9/2017 | Minster et al. | |
| 2017/0329346 A1 | 11/2017 | Latotzki | |
| 2018/0354502 A1 | 12/2018 | Yaldo et al. | |
| 2019/0308609 A1 | 10/2019 | Gieseke et al. | |
| 2020/0098196 A1* | 3/2020 | Bruce | G08G 1/143 |
| 2020/0269835 A1* | 8/2020 | Hara | G08G 1/143 |

FOREIGN PATENT DOCUMENTS

| | | | | |
|---|---|---|---|---|
| EP | 3470302 A1 * | 4/2019 | ............ | B60W 10/20 |
| GB | 2496905 A * | 5/2013 | ............ | B60W 30/06 |

OTHER PUBLICATIONS

Corey Harper, "Driverless cars could spell the end for downtown parking—and cities need to plan ahead", NewStatesman, CityMetric: https://citymetric.com/transport, Oct. 1, 2019, 14 pages.

* cited by examiner

*Primary Examiner* — Daryl C Pope
(74) *Attorney, Agent, or Firm* — Brandon Hicks; Eversheds Sutherland (US) LLP (57) ABSTRACT

The disclosure describes systems and methods for determining and adjusting a parking position of a vehicle. In particular, the vehicle may determine a first parking space where the vehicle can move to a second parking space and exit the second parking space in a forward direction.

16 Claims, 3 Drawing Sheets

SYSTEMS AND METHODS FOR DETERMINING AND IMPROVING A PARKING POSITION

BACKGROUND

For larger vehicles, such as sport utility vehicles and trucks, parking in a designated parking space may be difficult. In particular, reversing from a parking space can be difficult because of the space required. In addition, larger vehicles tend to take up more of a parking space leaving little space between the vehicle and other vehicles on either side of the vehicle. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to determine and adjust a parking position. In particular, the vehicle may determine a first parking space where the vehicle can move to a second parking space and exit the second parking space in a forward direction.

Figure 1:
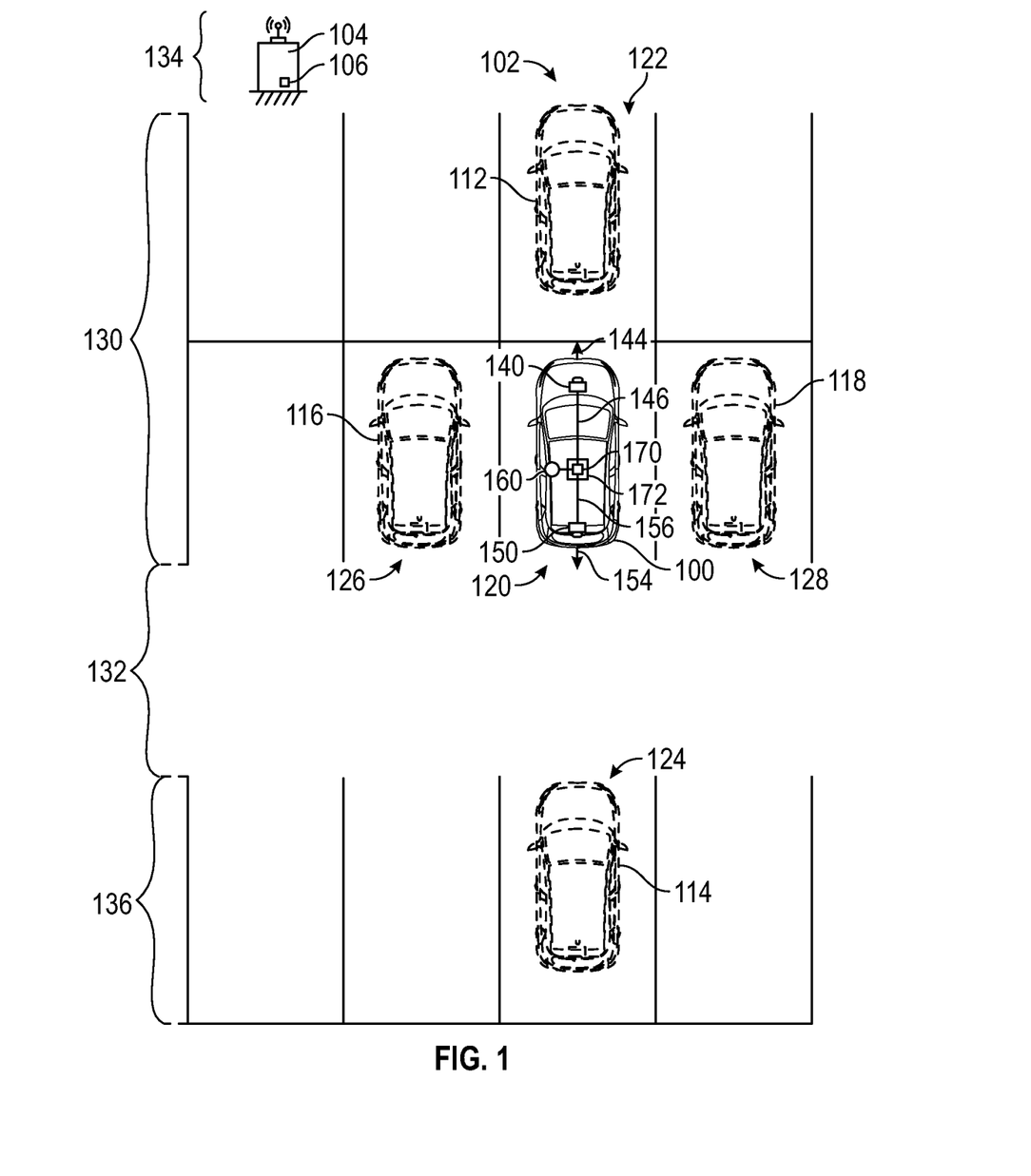
FIG. 1 depicts a vehicle in a parking lot environment in accordance with the present disclosure.

Referring to FIG. 1, a vehicle 100 may initially determine if there is an open parking space in a parking environment 102 that allows the vehicle 100 pull forward into the parking space and to exit the parking space in a forward direction (e.g., two aligned open parking spaces where the vehicle 100 can pull through).

To make this determination, the vehicle 100 may communicate with a RSU 104 or other vehicles 112, 114, 116, 118 using a vehicle-to-everything (V2V, V2X) communication standard. Particularly, the vehicle 100 may receive parking environment data 106 pertaining to the parking environment 102 including the locations of parking spaces, the occupation status of parking spaces, the predicted status of parking spaces (e.g., if occupied, time that paid parking will expire or based on length of occupancy or driver history), the type of vehicle (e.g., manually driven or autonomous vehicle) occupying a parking space, combinations thereof, and the like. The data 106 may also include objects (e.g., trailers, generators, storage containers, etc.) that are permanent or not predicted to move or the vehicle 100 may use object recognition features to identify such objects.

If an open space that allows the vehicle 100 to pull forward into a parking space and to exit in a forward direction is not available, the vehicle 100 may determine if there is an open parking space in the parking environment 102 with one or more longitudinally aligned parking spaces that are occupied but predicted to be unoccupied before the vehicle 100 is predicted to exit.

Referring to FIG. 1, the parking environment 102 may include a plurality of parking spaces including a first parking space 120, a second parking space 122, a third parking space 124, a fourth parking space 126 and a fifth parking space 128. The parking spaces 120, 122, 124 are longitudinally aligned such that the vehicle 100 can move (e.g., auntonomously) forward or backward in a straight line between the parking spaces 120, 122, 124. The parking spaces 120, 126, 128 are laterally aligned.

As shown in FIG. 1, the parking spaces 120, 122, 126, 128 are in a middle bank 130 of parking spaces with a driving lane 132, 134 on either side of the middle bank 130. The third parking space 124 is in an outer bank 136 of parking spaces. The driving lane 132 is between the middle bank 130 and the outer bank 136.

In FIG. 1, vehicle 100 determines that the first parking space 120 is unoccupied and that the parking spaces 122, 124 are occupied by vehicles 112, 114 but are predicted to be unoccupied, for example, within a threshold amount of time. The vehicle 100 thereby selects the first parking space 120 and generates instructions to pull forward into the first parking space 120.

The vehicle 100 may determine a lateral alignment in the parking space 120. In particular, the vehicle 100 may align itself off-center in the first parking space 120 if one of vehicles 116, 118 in laterally-adjacent parking spaces 126, 128 is an autonomous vehicle and the other of the vehicles 116, 118 is a manually driven vehicle. The vehicle 100 may park closer (e.g., offset from the center of first parking space 120) to the autonomous vehicle to prevent damage from a person entering or exiting the manually driven vehicle.

Once parked in the first parking space 120, the vehicle 100 determine if the vehicle 100 can move to position the vehicle 100 for a forward exit. The vehicle 100 monitors longitudinally aligned parking spaces 122, 124 to determine when one of the parking spaces is unoccupied. For example, the vehicle 100 may determine that one of the parking spaces 122, 124 is unoccupied through communicating with the RSU 104 (which may track the occupancy of the spaces with data 106), through communication with the vehicles 112, 114 using a vehicle-to-everything (V2V, V2X) communication standard, and/or through the use of cameras or other sensors. Once one of the longitudinally and aligned parking spaces 122, 124 is unoccupied, the vehicle 100 generates instructions to autonomously move to the unoccupied space and the vehicle moves to the unoccupied space.

For example, if the space 122 is unoccupied, the vehicle 100 drives forward and parks in space 122 until it is summoned and exits parking space 122 in a forward direction into driving lane 134. This may be done autonomously. Alternatively, if the space 124 is unoccupied, the vehicle 100 drives in reverse and parks in space 124 until it is summoned and exits parking space 124 in a forward direction into driving lane 132.

The vehicle may continue to look for opportunities to get closer by repeating the steps mentioned above. For example, the vehicle may autonomously reposition to a location near a parking lot exit or customer pickup point. If the vehicle is inside a multi-level parking garage, it may use the same method but move to a lower floor nearest the exit route. This can minimize the time it takes to reach the customer when summoned. Here, the vehicle may notify a driver of which floor the vehicle is on.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 illustrates a vehicle 100. The vehicle 100 may take the form of a passenger or commercial automobile such as, for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

The vehicle 100 includes devices or sensors that are configured or programmed to generate signals that help identify a longitudinally aligned parking space, devices or sensors to determine whether the parking space is occupied, and communication systems to determine whether a vehicle is manually driven or autonomous.

The devices or sensors may include image sensors (e.g., cameras 140, 150) mounted to the vehicle 100 to achieve visual perception. Each camera generates images 146, 156 of at least part of the environment around the vehicle 100. For purposes of clarity, a single camera is used for each direction. However, combinations of cameras may be used and the sensor data from multiple cameras may be fused together into a view of the environment around the vehicle.

Cameras 140, 150 can be mounted to face in the direction vehicle 100 is moving (e.g., forward or backwards). For purposes of teaching, the camera 140 (or a set of cameras) is a front-facing camera and the camera 150 (or a set of cameras) is a rear-facing camera. In particular, When the vehicle 100 pulls forward into the first parking space 120, the second parking space 122 and vehicle 112 are in the field of view of the forward-facing camera 140 (e.g, in the forward direction 144) and the third parking space 124 and vehicle 114 are in the field of view (e.g., in the rear facing direction 154) of the rear-facing camera 150.

The cameras 140, 150 each includes sensor components (e.g., a lens, an aperture, a shutter, a sensor plate, an IR emitter, an IR detector, etc.) and application-specific integrated circuit (ASIC). ASIC can include digital signal processing (DSP) functionality to perform various operations on image sensor data captured by sensor components.

Cameras 140, 150 can be similar types, or even the same type, of camera. Cameras 140, 150 have fields-of-view that can be similar and possibly even essentially the same. Within fields-of-view, cameras 140, 150 can respectively sense the parking environment 102 from the vehicle out to a certain distance threshold.

The cameras 140, 150 may be Red-Green-Blue/Infrared (RGB/IR) cameras that can generate images 146, 156 where each image section includes a Red pixel, a Green pixel, a Blue pixel, and an IR pixel. The RGB pixel intensities are used when there is sufficient light (e.g., during daytime). The intensity information from the IR pixels can be used during the night as well as in other low (or no) light environments to sense parking environment 102. Low (or no) light environments can include tunnels or other environments where natural light is obstructed.

Alternatively, cameras 140, 150 may include other sensor components (e.g., a lens, an aperture, a shutter, a sensor plate, a laser, a sensor for detecting laser reflections, etc.) and application-specific integrated circuit (ASIC). For example, camera 140, 150 may include a multipurpose time-of-flight (TOF) camera with a processing chip, such as, for example, a Red-Green-Blue-Infrared (RGB-IR) complementary metal-oxide semiconductor (CMOS) chip. Similar to LiDAR sensor, the laser emits a pulse of IR wavelength. A processing chip (e.g., within ASIC) reads the time-of-flight information to process depth of objects. The processing chip can set appropriate IR pixel intensity information based on object depths. LiDAR mode and IR pixel intensity can be used during the night, in other low (or no) light environments, or when otherwise appropriate, to sense the parking environment 102.

The devices may also include sensors (e.g., sensor 160) such as a Radio Detection and Ranging (RADAR or "radar") sensor configured for detection and localization of objects using radio waves, a Light Detecting and Ranging (LiDAR or "lidar") sensor, ultrasonic sensors, an inertial measurement unit (IMU), a global positioning sensor (GPS), and other vision sensors for trajectory, obstacle detection, object classification, and the like. Using LiDAR sensors, objects can be tracked based on three-dimensional (3D) point clouds.

Data from each camera 140, 150 and the LiDAR sensor 160 may be provided to a central sensor perception chip 170 of a vehicle computer 172. Perception chip 170 can be a general or special purpose processing unit, such as for example, a Central Processing Unit (CPU), a Graphics Processing Unit (GPU), etc. Alternately or additionally, perception chip can include logic circuits, such as, for example, an ASIC or Field-Programmable Gate Array (FPGA). A perception algorithm runs on perception chip.

The central sensor perception chip 170 may use a sensor fusion or perception algorithm to fuse the data into a view of the parking environment 102 around the vehicle 100 or otherwise process the data for use in understanding and navigating the parking environment 102.

The perception algorithm may include a neural network architected in accordance with a multi-layer (or "deep") model. A multi-layer neural network model can include an input layer, a plurality of hidden layers, and an output layer. A multi-layer neural network model may also include a loss layer. The plurality of hidden layers can perform a number of non-linear transformations.

For classification of fused camera sensor data (e.g., an image), values in the sensor data (e.g., pixel-values) are assigned to input nodes and then fed through the plurality of hidden layers of the neural network.

From the view of the parking environment 102, the perception algorithm can process camera or sensor data to identify and classify objects of interest within parking environment 102. Object classifications can include: other vehicles, parking spaces or lines, signs, obstructions (e.g., shopping carts, pedestrians), etc. The perception algorithm can also determine the location of an object within parking environment 102, the distance to the object, and if the object is moving, a path of the object.

Figure 2:
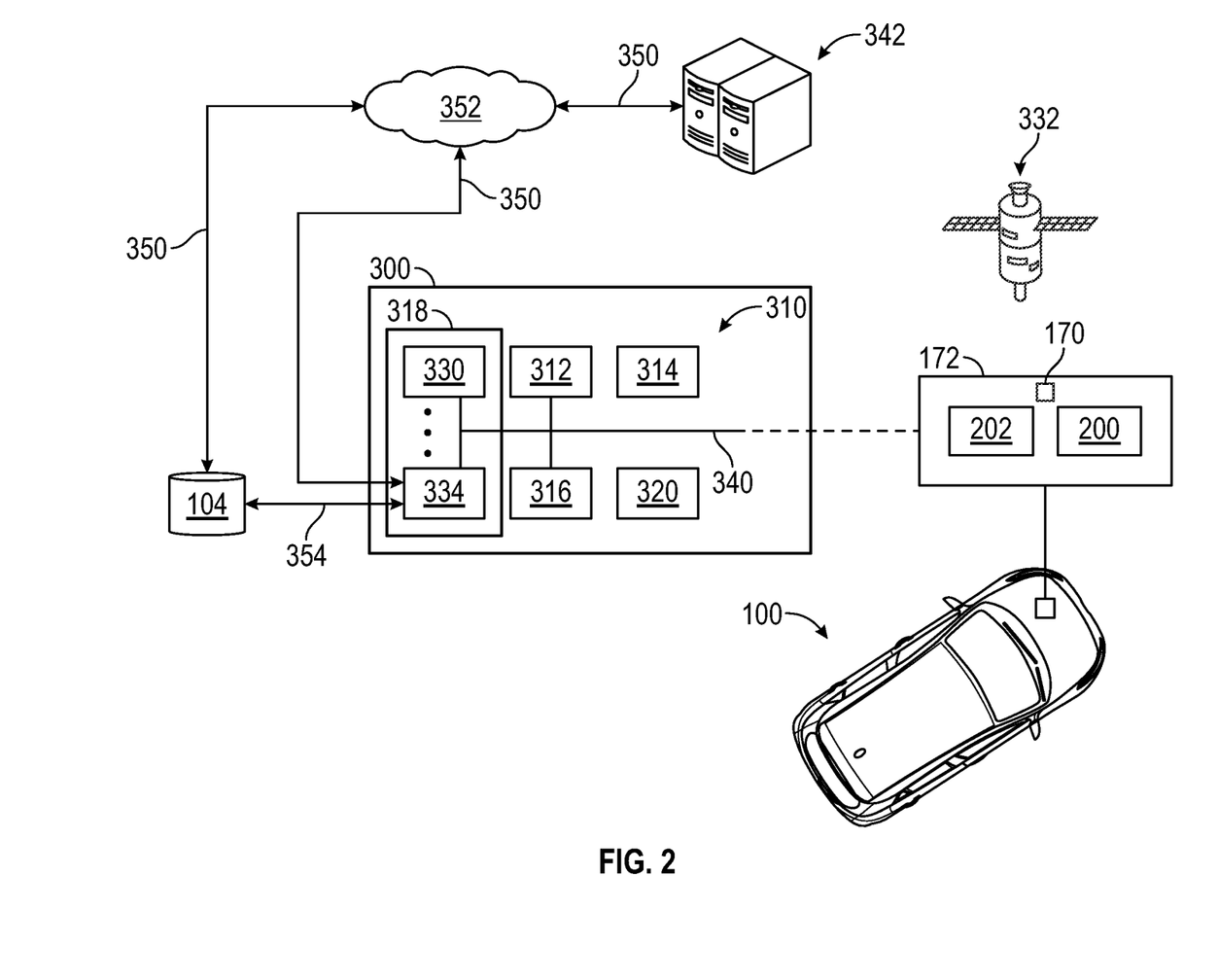
FIG. 2 depicts the vehicle including vehicle systems in accordance with the present disclosure.

Referring to FIG. 2, vehicle systems are described in greater detail.

The vehicle computer 172 includes computer components including a memory (e.g., memory 200) and a processor (e.g., a processor 202 and/or the perception chip 170). A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The VCU 300 includes a plurality of electronic control units (ECUs) 310 and is disposed in communication with the vehicle computer 172. The VCU 300 may coordinate the data between vehicle systems, connected servers, and other vehicles operating as part of a vehicle fleet. The VCU 300 may control aspects of the vehicle 100, and implement one or more instruction sets received from a vehicle system controller (such as vehicle computer 172) and/or received from a road side unit (RSU) 104. For example, the VCU 300 may control or include autonomous driving systems.

The VCU 300 can include or communicate with any combination of the ECUs 310, such as, for example, a Body Control Module (BCM) 312, an Engine Control Module (ECM) 314, a Transmission Control Module (TCM) 316, the Telematics Control Unit (TCU) 318, a Restraint Control Module (RCM) 320, and the like. The TCU 318 may be disposed in communication with the ECUs 310 by way of a Controller Area Network (CAN) bus 340. In some aspects, the TCU 318 may retrieve data and send data as a CAN bus 340 node.

The CAN bus 340 may be configured as a multi-master serial bus standard for connecting two or more of the ECUs 310 as nodes using a message-based protocol that can be configured and/or programmed to allow the ECUs 310 to communicate with each other. The CAN bus 340 may be or include a high-speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 310 may communicate with a host computer (e.g., the vehicle computer 172, the RSU 104, and/or server(s), etc.), and may also communicate with one another without the necessity of a host computer.

The CAN bus 340 may connect the ECUs 310 with the vehicle computer 172 such that the vehicle computer 172 may retrieve information from, send information to, and otherwise interact with the ECUs 310 to perform steps described according to embodiments of the present disclosure. The CAN bus 340 may connect CAN bus nodes (e.g., the ECUs 310) to each other through a two-wire bus, which may be a twisted pair having a nominal characteristic impedance. The CAN bus 340 may also be accomplished using other communication protocol solutions, such as Media Oriented Systems Transport (MOST) or Ethernet. In other aspects, the CAN bus 340 may be a wireless intra-vehicle CAN bus.

The VCU 300 may control various loads directly via the CAN bus 340 communication or implement such control in conjunction with the BCM 312. The ECUs 310 described with respect to the VCU 300 are provided for exemplary purposes only, and are not intended to be limiting or exclusive. Control and/or communication with other control modules is possible, and such control is contemplated.

The ECUs 310 may control aspects of vehicle operation and communication using inputs from human drivers, inputs from a vehicle system controller, and/or via wireless signal inputs received via wireless channel(s) from other connected devices. The ECUs 310, when configured as nodes in the CAN bus 340, may each include a central processing unit (CPU), a CAN controller, and/or a transceiver.

The TCU 318 can be configured to provide vehicle connectivity to wireless computing systems onboard and offboard the vehicle 100 and is configurable for wireless communication between the vehicle 100 and other systems, computers, servers, RSUs 104, vehicles 112, 114, 116, 118, and modules. For example, the TCU 318 may communicate whether a vehicle is manually driven or autonomous.

For example, the TCU 318 includes a Navigation (NAV) system 330 for receiving and processing a GPS signal from a GPS 332, a Bluetooth® Low-Energy Module (BLEM) 334, a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The TCU 318 may include wireless transmission and communication hardware that may be disposed in communication with one or more transceivers associated with telecommunications towers and other wireless telecommunications infrastructure. For example, the BLEM 334 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The BLEM 334 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 334 may include Generic Attribute Profile (GATT) device connectivity for client devices that respond to or initiate GATT commands and requests.

The RSU 104 and the TCU 318 may include radios configured to transmit (e.g., broadcast) and/or receive vehicle-to-everything (V2X) signals broadcast from another radio. Dedicated Short Range Communication (DSRC) is an implementation of a vehicle-to-everything (V2X) or a car-to-everything (CV2X) protocol. Any other suitable implementation of V2X/C2X may also be used. Other names are sometimes used, usually related to a Connected Vehicle program or the like.

The RSU 104 and the TCU 318 may include radio frequency (RF) hardware configured to transmit and/or receive signals, for example, using a 2.4/5.8 GHz frequency band.

Communication technologies described above, such as CV2X, may be combined with other technologies, such as Visual Light Communications (VLC), Cellular Communications, and short-range radar, facilitating the communication of position, speed, heading, relative position to other objects, and the exchange of information with other vehicles 112, 114, 116, 118, mobile devices, RSUs, or external computer systems.

External servers (e.g., servers 342) may be communicatively coupled with the vehicle 100 and the RSU 104 via one or more network(s) 352, which may communicate via one or more wireless channel(s) 350.

The RSU 104 may be connected via direct communication (e.g., channel 354) with the vehicle 100 using near field communication (NFC) protocols, Bluetooth® protocols, Wi-Fi, Ultra-Wide Band (UWB), and other possible data connection and sharing techniques.

The network(s) 352 illustrate example communication infrastructure in which the connected devices discussed in various embodiments of this disclosure may communicate. The network(s) 352 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The NAV system 330 may be configured and/or programmed to determine the vehicle location. The NAV system 330 may include a Global Positioning System (GPS) receiver configured or programmed to triangulate the vehicle location relative to satellites or terrestrial based transmitter towers associated with the GPS 332. The NAV system 330 may determine and share the vehicle location and receive locations such as the location of the other vehicles in the parking environment 102. The NAV system 330 may receive and store in memory fixed locations such as the locations of parking lot spaces in the parking environment 102.

The NAV system 330 may be further configured or programmed to develop routes from a current vehicle location to a selected destination, display a map and present directions to the selected destination, and determine an estimated time to travel to the selected location and a predicted time of arrival. The estimated time of arrival may be based on the position, speed, and heading or other vehicle information determined by the NAV system 330. The NAV system 330 may work with autonomous driving systems to move the vehicle 100 to a location.

The BCM 312 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 312 may also operate as a gateway for bus and network interfaces to interact with remote ECUs.

The BCM 312 may be configured for vehicle energy management, exterior lighting control, wiper functionality, power window and door functionality, heating ventilation and air conditioning systems, and driver integration systems. In other aspects, the BCM 312 may control auxiliary equipment functionality, and/or is responsible for integration of such functionality.

The BCM 312 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc.

AV control systems (e.g., cruise control, lane changing, collision avoidance, braking, steering, etc.) are configured to control vehicle operating components (e.g., accelerator, brakes, steering wheel, transmission, etc.) to autonomously operate the vehicle 100 in the parking environment 102. AV control systems can change the configuration of vehicle operating components based on views received from perception chip 170. Changes to vehicle operating components can facilitate changing speed or direction.

AV control systems may include the cameras 140, 150 and sensors 160 as well as any number of devices configured or programmed to generate signals that help navigate the vehicle 100 while the vehicle 100 is operating in an autonomous (e.g., driverless) mode. For example, the BCM 312 may coordinate autonomous driving operations based on data from the perception chip 170.

The vehicle 100 may be configured to operate in a fully autonomous (e.g., driverless) mode (e.g., level 5 autonomy) or in one or more partial autonomy modes. Examples of partial autonomy modes are widely understood in the art as autonomy Levels 1 through 5.

The memory 200 includes computer executable instructions that, when executed by the processor 202, cause the processor 202 to perform methods for determining and adjusting a parking position. The vehicle 100 determines where to park and whether to move the vehicle 100 to better position the vehicle 100 within the parking environment 102.

Figure 3:
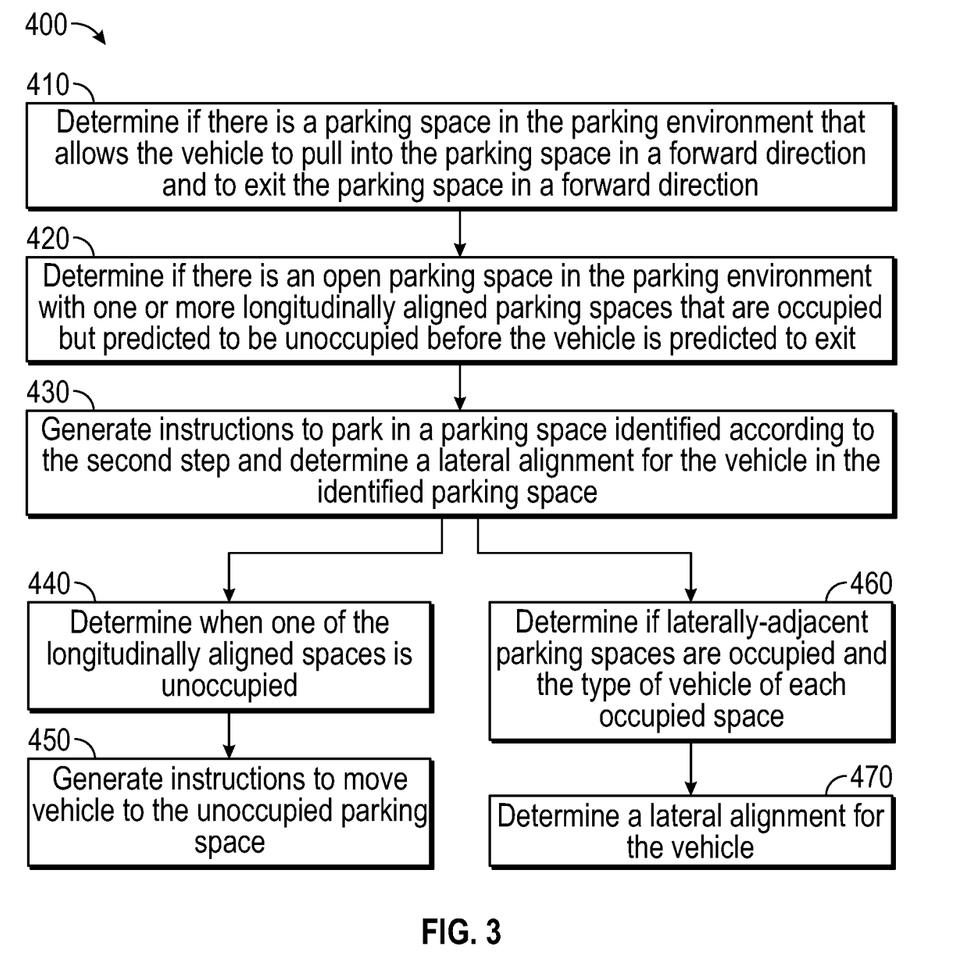
FIG. 3 depicts a method of determining and adjusting a parking position in accordance with the present disclosure.

According to a first step 410 an exemplary method 400, the vehicle 100 may initially determine if there is an unoccupied parking space in the parking environment 102 that allows the vehicle 100 to pull into the parking space in a forward direction 144 and to exit the parking space in a forward direction 144. For example, if two aligned parking spaces 120, 122 are unoccupied, the vehicle can drive from the lane 132 through the parking space 120, park in the parking space 122, and exit the parking space 122 into the lane 134.

To make this determination, the vehicle 100 may communicate with the RSU 104 or other vehicles 112, 114, 116, 118 using a vehicle-to-everything (V2V, V2X) communication standard. Particularly, the vehicle 100 may receive parking environment data 106 pertaining to the parking environment 102 including the locations of parking spaces and the occupation status of the parking spaces (e.g., occupied, unoccupied).

According to a second step 420, if an unoccupied parking space according to the criteria of step 410 is not available, the vehicle 100 may determine if there is an unoccupied parking space in the parking environment 102 with one or more longitudinally aligned parking spaces that are occupied but are predicted to be unoccupied before the vehicle 100 is predicted to exit or within a threshold amount of time.

To make this determination, the vehicle 100 may communicate with the RSU 104 or other vehicles 112, 114, 116, 118 using a vehicle-to-everything (V2V, V2X) communication standard. Particularly, the vehicle 100 may receive parking environment data 106 pertaining to the parking environment 102 including the locations of parking spaces, the occupation status of parking spaces, the predicted status of parking spaces (e.g., if occupied, time that paid parking will expire or based on length of occupancy or driver history), and the type of vehicle (e.g., manually driven or autonomous vehicle) occupying a parking space. The data 106 may also include objects (e.g., trailers, generators, storage containers, etc.) that are permanent or not predicted to move or the vehicle 100 may use object recognition features to identify such objects.

According to a third step 430, the vehicle 100 determines a lateral alignment for the vehicle 100 in the determined parking space. For example, the vehicle 100 determines if the laterally-adjacent parking spaces are occupied and if the vehicle in each occupied space is an autonomous vehicle or a manually driven vehicle.

If both of laterally-adjacent parking spaces are occupied, and if one of vehicles 116, 118 in laterally-adjacent parking spaces 126, 128 is an autonomous vehicle and the other of the vehicles 116, 118 is a manually driven vehicle, the vehicle 100 may align itself off-center in the first parking space 120. In particular, the vehicle 100 may park closer (e.g., offset from the longitudinal center of first parking space 120) to the autonomous vehicle to prevent damage from a person entering or exiting the manually driven vehicle. Otherwise, the vehicle 100 may align itself with the longitudinal center of the parking space.

According to a fourth step 440, once parked in the determined parking space, the vehicle monitors the one or more occupied longitudinally aligned parking spaces to determine when one of the one or more longitudinally aligned parking spaces is unoccupied. To make this determination, the vehicle 100 may communicate with the RSU 104 or other vehicles 112, 114, 116, 118 using a vehicle-to-everything (V2V, V2X) communication standard or may use vehicle systems including cameras 140, 150 and or sensors 160 to perform object detection and/or localization. If using the V2X communication standard, the vehicle 100 may receive parking environment data 106 including the locations of parking spaces, the occupation status of parking spaces, and the predicted status of parking spaces.

According to a fifth step, when a monitored parking space is determined to be unoccupied, the vehicle 100 generates instructions to autonomously move to the unoccupied parking space. For example, if the vehicle 100 is parked in the space 120 and the space 122 is unoccupied, the vehicle 100 moves in the forward direction 144 to the space 122 and is thereafter positioned to exit the space 122 in the forward direction 144 into the lane 134. Or, if the vehicle 100 is parked in the space 120 and the space 124 is unoccupied, the vehicle 100 moves in the reverse direction 154 to the space 124 and is thereafter positioned to exit the space 124 in the forward direction 144 into the lane 132.

According to a sixth step 460, following the third step 430 (e.g., in parallel with the fourth step 440) and repeating aspects of the second step 420, the vehicle 100 determines if the laterally-adjacent parking spaces are occupied and if the vehicle in each occupied space is an autonomous vehicle or a manually driven vehicle.

Again, if both of laterally-adjacent parking spaces are occupied, and if one of vehicles 116, 118 in laterally-adjacent parking spaces 126, 128 is an autonomous vehicle and the other of the vehicles 116, 118 is a manually driven vehicle, the vehicle 100 may confirm its off-center position or reposition itself to be off-center in the first parking space 120. In particular, the vehicle 100 may reposition itself to be closer (e.g., offset from the longitudinal center of first parking space 120) to the autonomous vehicle to prevent damage from a person entering or exiting the manually driven vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a first parking space in a parking environment that is unoccupied and that is longitudinally aligned with at least a second parking space, wherein the second parking space is occupied;
   generating instructions to park a vehicle in the first parking space;
   parking the vehicle in the first parking space;
   determining a lateral alignment of the vehicle in the first parking space based on one or more types of vehicles in parking spaces that are laterally adjacent to the first parking space, wherein, if the one or more types of vehicles in the parking spaces that are laterally adjacent to the first parking space include a manually-driven vehicle and an autonomous vehicle, the lateral alignment of the vehicle is off-center, with more space between the manually-driven vehicle and the vehicle, and less space between the autonomous vehicle and the vehicle;
   determining when the second parking space is unoccupied while the vehicle is parked in the first parking space;
   generating instructions to move the vehicle to the second parking space; and
   autonomously moving the vehicle to the second parking space.

2. The method of claim 1, further comprising determining a predicted time in the future when an occupancy status of the second parking space is predicted to be unoccupied.

3. The method of claim 2, further comprising determining that the predicted time in the future is less than a predetermined threshold time.

4. The method of claim 2, wherein the occupancy status of the second parking space is determined based on an image from a camera and a measurement from a sensor.

5. The method of claim 1, wherein, if the second parking space is in a forward direction from the first parking space, the vehicle moves to the second parking space in the forward direction.

6. The method of claim 1, wherein, if the second parking space is in a reverse direction from the first parking space, the vehicle moves to the second parking space in the reverse direction.

7. The method of claim 1, further comprising determining if the parking environment includes an unoccupied parking space that would allow the vehicle to pull into the unoccupied parking space in a forward direction and to exit the unoccupied parking space in the forward direction.

8. The method of claim 7, further comprising determining if the parking environment includes two longitudinally aligned unoccupied parking spaces.

9. The method of claim 1, further comprising receiving parking environment data including at least one of locations of parking spaces, occupancy statuses of the parking spaces, and predicted occupancy statuses of the parking spaces.

10. A vehicle system, comprising:
    a processor;
    a memory comprising:
      parking environment data including at least one of locations of parking spaces, occupancy statuses of the parking spaces, predicted occupancy statuses of the parking spaces, and types of vehicles occupying the parking spaces; and
      computer executable instructions that, when executed by the processor, cause the processor to:
        determine a first parking space in a parking environment that is unoccupied and that is longitudinally aligned with at least a second parking space, wherein the second parking space is occupied;
        generate instructions to park a vehicle in the first parking space, wherein the instructions comprise determining a lateral alignment of the vehicle in the first parking space based on one or more types of vehicles in parking spaces that are laterally adjacent to the first parking space, and wherein, if the one or more types of vehicles in the parking spaces that are laterally adjacent to the first parking space include a manually-driven vehicle and an autonomous vehicle, the lateral alignment of the vehicle is off-center, with more space between the manually-driven vehicle and the vehicle, and less space between the autonomous vehicle and the vehicle;
        park the vehicle in the first parking space;
        determine when the second parking space is unoccupied while the vehicle is parked in the first parking space; and generate instructions to move the vehicle to the second parking space; and autonomously move the vehicle to the second parking space.

11. The vehicle system of claim 10, wherein the instructions comprise determining a predicted time in the future when an occupancy status of the second parking space is predicted to be unoccupied.

12. The vehicle system of claim 11, wherein the instructions further comprise determining that the predicted time in the future is less than a predetermined threshold time.

13. The vehicle system of claim 10, further comprising a camera and a sensor, and wherein the instructions comprise determining an occupancy status of the second parking space based on an image from the camera and a measurement from the sensor.

14. The vehicle system of claim 10, wherein, if the second parking space is in a forward direction from the first parking space, the instructions comprise moving the vehicle to the second parking space in the forward direction.

15. The vehicle system of claim 10, wherein, if the second parking space is in a reverse direction from the first parking space, the instructions comprise moving the vehicle to the second parking space in the reverse direction.

16. The vehicle system of claim 10, wherein the instructions comprise determining if the parking environment includes two longitudinally aligned unoccupied parking spaces.

* * * * *